Sept. 20, 1927.
O. G. MYERS
1,642,742
THERMOSTAT SWITCH
Filed Oct. 1, 1924
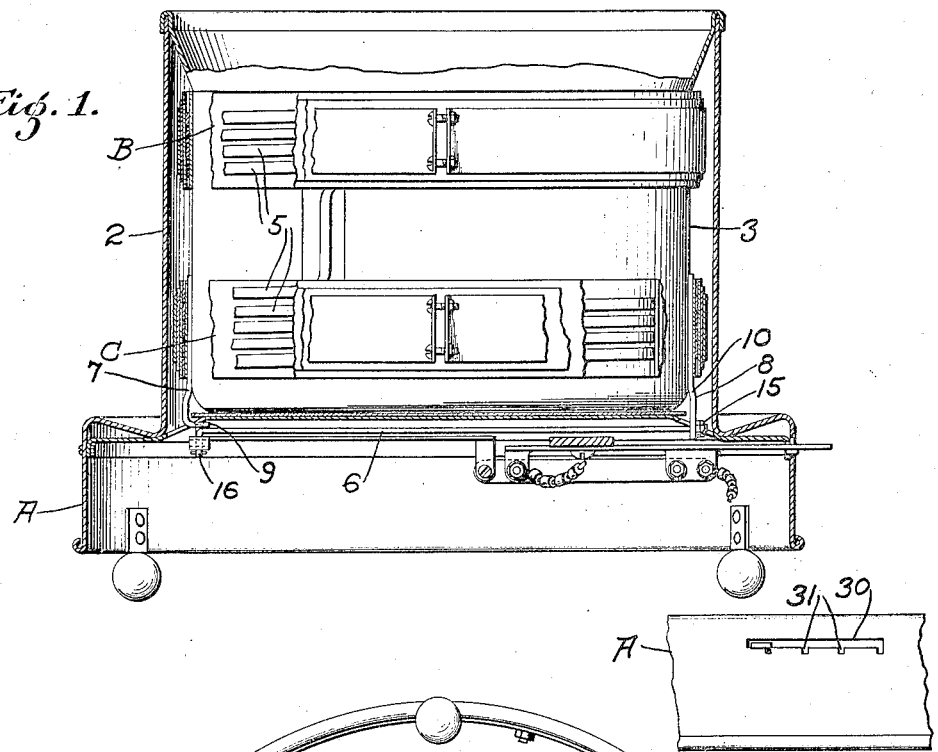
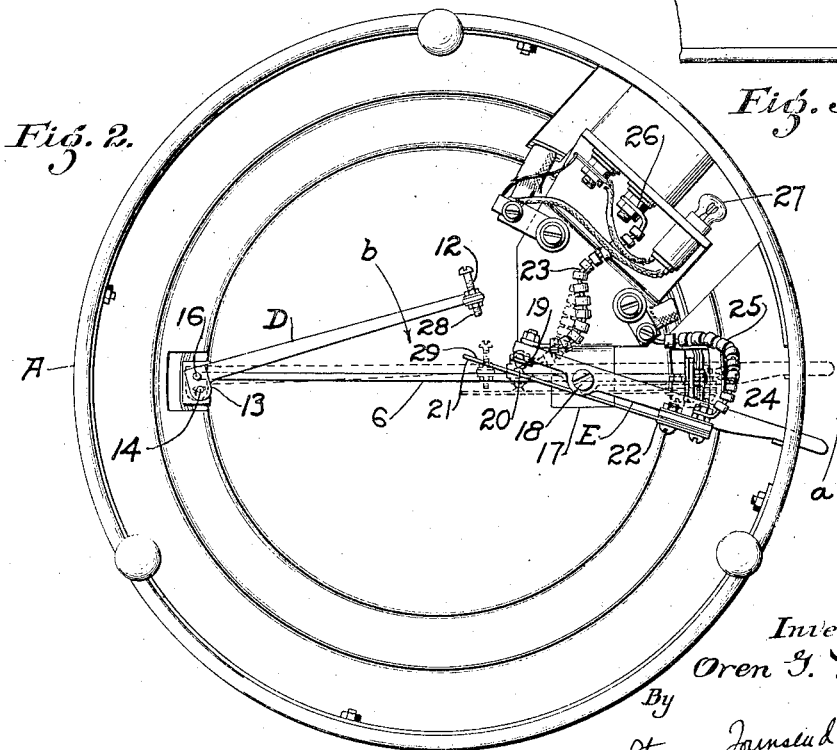
Inventor:
Oren G. Myers.
By
Dewey, Strong, Townsend & Loftus
Attorneys.

Patented Sept. 20, 1927.

1,642,742

UNITED STATES PATENT OFFICE.

OREN G. MYERS, OF SAN MATEO, CALIFORNIA.

THERMOSTAT SWITCH.

Application filed October 1, 1924. Serial No. 740,945.

This invention relates to electrically heated devices, such as ovens, irons, etc., and especially to a thermostatically actuated switch whereby the temperature of such devices may be automatically regulated.

The object of the present invention is to generally improve and simplify the construction and operation of thermostatic switches whereby electric circuits are controlled; to provide a switch which is adjustable for different temperatures; a switch which is exceedingly sensitive in action and which is capable of automatically making or breaking a circuit within temperature variations of 1° F.; and furthermore, to provide a thermostat switch consisting of two members having different degrees of expansion and one member forming a part of the device to be heated.

One form which my invention may assume is exemplified in the following description and illustrated in the accompanying drawings, in which—

Fig. 1 is a side elevation of an electric cooker showing the application of the thermostatic switch, said side elevation being partially in section and partially broken away.

Fig. 2 is a bottom view of the electric cooker, said view also showing the thermostatic switch.

Fig. 3 is a detailed side elevation of a portion of the base showing the slot through which the temperature regulating lever extends.

Referring to the drawings in detail, and particularly to Figs. 1 and 2, A indicates an enlarged base member upon which is mounted an exterior cylindrical shell 2, said shell being suitably secured to the base A or formed integral therewith as shown in Fig. 1. Supported or hung from the upper end of the shell by means of an annular lip-like extension, and extending downwardly into the shell, is a cylindrical container 3 which serves as a receptacle for material to be cooked. This cylindrical container is smaller in diameter than the exterior shell 2 and an intermediate annular space 4 is thus formed. Disposed in this space and insulated both from the container 3 and the exterior shell 2 is a pair of resistance heating elements B and C of any suitable construction, said elements being generally indicated by annular ribbons 5 helically wound about the inner container as shown in Fig. 1.

The purpose of the present invention is to provide a simple, sensitive thermostatic switch whereby the electric circuit through the resistance elements may be automatically controlled, so that a predetermined temperature may be maintained within the cooking utensil. Another purpose of the invention is to provide an adjustable thermostatic switch whereby different temperatures may be maintained and automatically maintained when the switch is adjusted.

In the present instance the cooking utensil indicated at 3 forms one member of the switch and a rod 6 the other member. The cooking utensil is constructed of aluminum, while the rod 6 is constructed of a metal known as invar. This metal has a very low coefficient of expansion when comparison is made with aluminum, and it is therefore ideal for the purpose sought. To obtain the full expansion of the cooking utensil 3, a pair of side lugs is employed. These lugs are indicated at 7 and 8 and they are welded or otherwise secured to the exterior surface of the cylindrical container. The lug 8 is extended downwardly a suitable distance to receive one end of the rod 6. The other lug 7 is also extended downwardly below the container and is bent at right angles to form a bearing bracket 9, the purpose of which will hereinafter be described. The lugs 7 and 8, as previously stated, are directly welded to the container 3, and it will also be noted that they are surrounded by the resistance or heating element C. The portion of the cooking utensil to which the lugs 7 and 8 are secured is for this reason subjected to the greatest temperature and will also be subjected to a maximum amount of expansion, and it is for this reason that the lower ends of the lugs are bent slightly outwardly as indicated at 10 to maintain them out of contact with that portion of the utensil which is not subjected to the same temperature; that is, the utensil, at points slightly below or above the heating element C, will be cooler than that portion directly underlying the heating element, and as such temperature variations exist throughout the container or utensil, it is obvious that the lugs should not contact except with that portion which is subjected to the maximum amount of expansion.

The switch opening and closing the circuits through the heating elements B and C is best illustrated in Fig. 2. It consists of two levers generally indicated at D and E. The lever D is provided with an adjustable contact 12 at one end, and its opposite end is bent at right angles or offset as indicated at 13, the offset end being pivotally supported on a pin 14 which is carried by the lower right-angular extension of the lug 7. One end of the rod 6 passes through the lug 8 and it is adjustably secured in said lug by means of nuts 15. The opposite end of the rod 6 is bent downwardly at right angles, as shown in Fig. 1, and this right-angular bend forms a pin 16 which passes through the offset end 13 of the lever D. In other words, rod 6 and pin 16 serve the function of a link to impart a swinging movement to the lever D. This action will be later described.

The lever E in reality carries the switch. It is pivotally supported on a bracket 17 at the point indicated at 18. It carries a pair of contacts 19 and 20, the contact 20 being formed on a spring arm 21 which is secured to lever E at the point 22. One side of the electric circuit is connected with the contact 19 through a wire 23, and the other side of the circuit is connected with a contact 24 through a wire 25. Contact 20 is moved to and away from the contact 19 by means of the lever D and the adjustable contact 12 and the circuit is in this manner automatically opened and closed. Wires 23 and 25 are connected with an ordinary socket, such as shown at 26, and an ordinary plug switch is inserted when it is desired to employ the cooker; that is, the heating elements employed in connection with the cooker shown require a comparatively small wattage and it is thus possible to use the ordinary lighting circuit. A tell-tale light is employed as indicated at 27. This light is shunted in on the circuit and thus visibly indicates when the circuit goes on and off. The cooker is capable of operating at different temperatures and it is for this reason that an adjustable switch is employed, adjustability being obtained by the swinging action of the switch lever E.

To clearly understand this action it will be supposed that lever D assumes the full line position shown in Fig. 2 when the device is cold. If lever E assumes the full line position, the lowest temperature will be obtained, as lever D will only have to travel the distance formed between the points 28 and 29. If lever E is swung in the direction of arrow a, it will be seen that the distance between the points 28 and 29 will be increased and that the temperature finally obtained will be correspondingly increased. The highest temperature obtainable will be obtained when lever E has been moved its maximum distance, or has reached the end of its guide slot, which is indicated at 30. (See Fig. 3.) Notches are formed in the bottom of the slot 30 as shown at 31 and the lever E may be interlocked with any one of these notches. Each notch represents a predetermined temperature and the switch may thus be set to any predetermined temperature desired.

The operation of the switch will be as follows: When an electric circuit is closed through the heating elements B and C, through insertion of an ordinary switch plug in the socket 26, the inner container 3 will gradually become heated and will finally reach a predetermined temperature. The utensil will, of course, also gradually expand in proportion to the temperature increase and as it is free to expand equally in all directions, it is obvious that lug 7 will move outwardly from a given central point, and similarly that lug 8 will move outwardly a given distance from a central point within the utensil. Again, it might be stated that the exterior diameter of the utensil 3 is increased due to expansion of the metal and hence the distance between the lugs 7 and 8, either explanation being correct.

Now it must be understood that rod 6 does not expand but retains its original length, as the metal from which it is constructed is, practically speaking, non-expansible. One end of the rod 6 is secured to the lug 8 and the other end is secured to the lever D. Hence, as the distance between the lugs 7 and 8 increases, a pull will be exerted by rod 6 through means of pin 16 on lever D and it will swing inwardly in the direction of arrow b towards the spring lever 21 and the circuit will be broken through the contacts 19 and 20 when set screw 12 engages the spring arm and imparts movement thereto. Such breaking of the circuit is accomplished when a predetermined temperature is reached and this predetermined temperature will, of course, depend upon the position assumed by the switch lever E as previously described. The moment the circuit is broken through the elements B and C, the temperature gradually drops and reverse movement is transmitted to lever D, thus permitting the contacts 19 and 20 to again engage. The circuit is, as the result, intermittently opened and broken and the predetermined temperature desired is thus automatically maintained.

The thermostatic switch here shown permits a close temperature regulation. This is due to the fact that one of its actuating members forms the cooking utensil itself, and it is also due to the fact that the only movable member actuated by thermostatic action is the lever D, and as only one movable member is employed lost motion may be practically eliminated and close regulation can be obtained.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. A device of the character described comprising a cylindrical-shaped container constructed of an expansible metal, a pair of lugs secured to the container at points diametrically opposite each other, a lever pivotally mounted on one of said lugs, a rod of invar metal secured at one end to the opposite lug and at the other end to the pivotally mounted lever at a point adjacent the pivot so as to transmit a rocking movement to the lever during expanding action of the cylindrical container, a second pivotally mounted lever, a switch carried thereby and adapted to control an electric circuit, and a projecting arm on the switch in the path of movement of the first-named lever, said projection adapted to open and close the switch when engaged and released by the first-named lever.

2. A device of the character described comprising a cylindrical-shaped container constructed of an expansible metal, a pair of lugs secured to the container at points diametrically opposite each other, a lever pivotally mounted on one of said lugs, a rod of invar metal secured at one end to the opposite lug and at the other end to the pivotally mounted lever at a point adjacent the pivot so as to transmit a rocking movement to the lever during expanding action of the cylindrical container, a second pivotally mounted lever, a switch carried thereby and adapted to control an electric circuit, a projecting arm on the switch in the path of movement of the first-named lever, said projection adapted to open and close the switch when engaged and released by the first-named lever, and means permitting adjustment of the position of the lever upon which the switch is mounted.

3. A device of the character described comprising a container constructed of an expansible material, a pair of supporting members secured to the container at points opposite each other, a lever pivotally mounted on one of said lugs, a rod of non-expansible material secured at one end to the opposite lug and at the other end to the pivotally mounted lever at a point adjacent the pivot so as to transmit a rocking movement of the lever during the expanding action of the container, a second pivotally mounted lever, a switch carried thereby and adapted to control the electric circuit and means on the switch disposed in the path of movement of the first-named lever, said means adapted to open and close the switch when engaged or released by the first-named lever.

4. A device of the character described comprising a container constructed of an expansible material, a pair of supporting members secured to the container at points opposite each other, a lever pivotally mounted on one of said lugs, a rod of non-expansible material secured at one end to the opposite lug and at the other end to the pivotally mounted lever at a point adjacent the pivot so as to transmit a rocking movement of the lever during the expanding action of the container, a second pivotally mounted lever, a switch carried thereby and adapted to control the electric circuit and a projecting arm on the switch in the path of movement of the first-named lever, said projection adapted to open and close the switch when engaged and released by the first-named lever.

5. A device of the character described comprising a container constructed of an expansible material, a pair of supporting members secured to the container at points opposite each other, a lever pivotally mounted on one of said lugs, a rod of non-expansible material secured at one end to the opposite lug and at the other end to the pivotally mounted lever at a point adjacent the pivot so as to transmit a rocking movement of the lever during the expanding action of the container, a second pivotally mounted lever, a switch carried thereby and adapted to control the electric circuit and means on the switch disposed in the path of movement of the first-named lever, said means adapted to open and close the switch when engaged or released by the first-named lever and means whereby the position of the switch supporting lever may be changed.

6. A device of the character described comprising a container constructed of an expansible material, a pair of supporting members secured to the container at points opposite each other, a lever pivotally mounted on one of said lugs, a rod of non-expansible material secured at one end to the opposite lug and at the other end to the pivotally mounted lever at a point adjacent the pivot so as to transmit a rocking movement of the lever during the expanding action of the container, a second pivotally mounted lever, a switch carried thereby and adapted to control the electric circuit and means on the switch disposed in the path of movement of the first-named lever, said means adapted to open and close the switch when engaged or released by the first-named lever and means whereby the position of the switch supporting lever may be changed and means permitting adjustment of the position of the lever upon which the switch is mounted.

OREN G. MYERS.